(12) United States Patent
Furukawa

(10) Patent No.: US 10,793,706 B2
(45) Date of Patent: Oct. 6, 2020

(54) FLUORORUBBER COMPOSITION

(71) Applicant: NOK Corporation, Tokyo (JP)

(72) Inventor: Tomonori Furukawa, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/060,565

(22) PCT Filed: Nov. 25, 2016

(86) PCT No.: PCT/JP2016/085031
§ 371 (c)(1),
(2) Date: Jun. 8, 2018

(87) PCT Pub. No.: WO2017/110364
PCT Pub. Date: Jun. 29, 2017

(65) Prior Publication Data
US 2018/0362742 A1    Dec. 20, 2018

(30) Foreign Application Priority Data

Dec. 21, 2015 (JP) ................. 2015-248398

(51) Int. Cl.
| | | |
|---|---|---|
| *C08K 5/14* | (2006.01) | |
| *C08K 9/06* | (2006.01) | |
| *C09K 3/10* | (2006.01) | |
| *C08L 15/02* | (2006.01) | |
| *C08L 27/12* | (2006.01) | |
| *B29C 35/02* | (2006.01) | |
| *B29D 99/00* | (2010.01) | |
| *C08K 7/02* | (2006.01) | |
| *C08K 3/34* | (2006.01) | |
| *C08K 7/10* | (2006.01) | |
| *B61F 99/00* | (2006.01) | |

(52) U.S. Cl.
CPC ............ *C08L 15/02* (2013.01); *B29C 35/02* (2013.01); *B29D 99/0085* (2013.01); *C08K 5/14* (2013.01); *C08K 9/06* (2013.01); *C08L 27/12* (2013.01); *C09K 3/10* (2013.01); *B61F 99/00* (2013.01); *C08K 3/34* (2013.01); *C08K 7/02* (2013.01); *C08K 7/10* (2013.01); *C08K 2201/003* (2013.01); *C08K 2201/004* (2013.01)

(58) Field of Classification Search
CPC .......... B29C 35/02; B29D 99/00; C08K 5/14; C08K 7/10; C08K 9/06; C08L 15/02
See application file for complete search history.

(56) References Cited

U.S. PATENT DOCUMENTS

| | | | |
|---|---|---|---|
| 2001/0000343 A1* | 4/2001 | Bowers | C08F 214/222 526/255 |
| 2006/0004126 A1 | 1/2006 | Park et al. | |
| 2006/0142467 A1 | 6/2006 | Park | |
| 2011/0200777 A1 | 8/2011 | Doi et al. | |
| 2013/0129537 A1 | 5/2013 | Kawabata et al. | |
| 2013/0267662 A1 | 10/2013 | Doi et al. | |
| 2013/0280490 A1* | 10/2013 | Takemura | C08J 5/00 428/156 |
| 2015/0197619 A1 | 7/2015 | Yoshimura | |

FOREIGN PATENT DOCUMENTS

| | | |
|---|---|---|
| EP | 2 883 911 A1 | 6/2013 |
| JP | 2006-125454 A | 5/2006 |
| JP | 2006-193741 A | 7/2006 |
| JP | 2008/64201 A | 3/2008 |
| WO | WO 2010/030860 A1 | 3/2010 |
| WO | WO 2014/024661 A1 | 2/2014 |
| WO | WO 2014/175079 A1 | 10/2014 |
| WO | WO 2016/171183 A1 | 10/2016 |

OTHER PUBLICATIONS

Machine translation of WO2014/175079 downloaded Aug. 14, 2019.*
International Preliminary Report on Patentability and Written Opinion from corresponding PCT application No. PCT/JP2016/085031 dated Jun. 26, 2018 (5 pgs).

* cited by examiner

Primary Examiner — Irina S Zemel
Assistant Examiner — Jeffrey S Lenihan

(57) ABSTRACT

A fluororubber composition comprising 10 to 50 parts by weight of wollastonite and 0.5 to 10 parts by weight of organic peroxide based on 100 parts by weight of peroxide-crosslinkable fluororubber,
the wollastonite being needle-like or fibrous wollastonite having an average fiber diameter of 5 μm or less and an average fiber length of 40 to 80 μm, and
the wollastonite being surface-treated with an amino silane coupling agent or an epoxy silane coupling agent. The fluororubber composition that can be suitably used as, for example, a molding material for normal/reverse rotation oil seals that allow continuous excellent sealing of fluid in the operation of normal and reverse rotation.

10 Claims, No Drawings

FLUORORUBBER COMPOSITION

RELATED APPLICATION

This application is a 35 U.S.C. § 371 national phase filing of International Patent Application No. PCT/JP2016/085031, filed Nov. 25, 2016, which claims priority under 35 U.S.C. § 119 to Japanese Patent Application No. 2015-248398, filed Dec. 21, 2015, the entire disclosure of which is hereby expressly incorporated by reference.

TECHNICAL FIELD

The present invention relates to a fluororubber composition. More particularly, the present invention relates to a fluororubber composition that can be suitably used as, for example, a molding material for rotational sliding seal products, such as oil seals.

BACKGROUND ART

Oil seals are widely used as important machine parts in the field of vehicles, industrial machines, and the like. Of these, normal/reverse rotation oil seals, which are intended to continuously seal fluid in the operation of normal and reverse rotation of various members, are used in a wide range of fields as, for example, member parts for pumps, vehicle differential gears, agricultural machines, railway vehicles, etc.

In a conventionally used oil seal, the sealed fluid may be leaked when the member in contact with the oil seal is rotated in a normal direction and then rotated in a reverse direction. In order to avoid this defect, for example, Patent Document 1 proposes an oil seal comprising an oil seal lip attached to a first annular member to be fitted to one member and closely sliding with the other member, and a plurality of screw portions alternately provided in groups on an inclined surface of the oil seal lip on an opposite sealing side to be sealed, the screw portions having specific angles of inclination relative to the rotating directions of the other member during normal rotation and reverse rotation; wherein auxiliary screw portions having specific angles of inclination relative to the rotating direction and reverse rotating direction in which each screw portion is provided are provided to be paired with the respective screw portions. However, only with the structure in which such auxiliary screws are provided to be paired with the screw portions, when normal rotation and reverse rotation are repeated, some defects may occur in the condition of the sealing surface due to abrasion, and seal leakage may occur during reverse rotation.

As an abrasion resistant material for normal/reverse rotation oil seals used as members for railway vehicles, etc., the present applicant has previously proposed in Patent Document 2 a normal/reverse rotation oil seal for railway vehicles, wherein a fluororubber composition prepared by adding, to fluororubber, wollastonite having an aspect ratio of 8 or more in an amount of 1 to 100 parts by weight based on 100 parts by weight of the rubber and kneading the compound, is vulcanization molded to form a sliding surface. However, due to the increase in the speed of the railway, including bullet trains (Shin kansen), oil seals are also required to have durability performance under severe conditions, such as high temperature and high speed.

In response to such a request, the present applicant has further proposed in Patent Document 3 a fluororubber composition comprising 1 to 100 parts by weight of a needle-like or fibrous filler having an average fiber diameter of 5 μm or less and an average fiber length of 40 to 80 μm, based on 100 parts by weight of fluororubber comprising a vinylidene fluoride-hexafluoropropylene-tetrafluoroethylene-ethylene-perfluoro(methyl vinyl ether) quinary copolymer, whereby the fluororubber composition can be suitably used as, for example, a molding material for normal/reverse rotation oil seals that have excellent durability and allow continuous excellent sealing of fluid in the operation of normal and reverse rotation.

However, even when this fluororubber composition is used, leakage occurs in some cases in an environment where air permeability is low and heat is accumulated. Thus, in addition to improvement of heat resistance, further improvement of durability are required.

PRIOR ART DOCUMENT

Patent Document

Patent Document 1: JP-A-2006-125454
Patent Document 2: JP-A-2008-064201
Patent Document 3: WO 2014/175079 A1

OUTLINE OF THE INVENTION

Problem to be Solved by the Invention

An object of the present invention is to provide a fluororubber composition that can be suitably used as, for example, a molding material for normal/reverse rotation oil seals that allow continuous excellent sealing of fluid in the operation of normal and reverse rotation.

Means for Solving the Problem

The above object of the present invention can be achieved by a fluororubber composition comprising 10 to 50 parts by weight of wollastonite and 0.5 to 10 parts by weight of organic peroxide based on 100 parts by weight of peroxide-crosslinkable fluororubber, the wollastonite being needle-like or fibrous wollastonite having an average fiber diameter of 5 μm or less and an average fiber length of 40 to 80 μm, and the wollastonite being surface-treated with an amino silane coupling agent or an epoxy silane coupling agent.

Effect of the Invention

Fluororubber vulcanization molded products obtained from the fluororubber composition according to the present invention exhibit the following excellent effects: the molded products become to have resistance to deformation due to the shape effect of wollastonite, thereby suppressing, for example, the deformation of the oil seal sliding surface in the sliding direction; and because an excellent lubrication condition is produced on the sliding surface, the molded products show good torque values while maintaining sealing properties for a long period of time from the initial use to after abrasion by the use.

Therefore, the sealing materials obtained by vulcanization molding of the fluororubber composition of the present invention allow continuous excellent sealing of fluid in the operation of normal and reverse rotation even under relatively high temperature conditions where the temperature of the use environment is, for example, 100 to 200° C. Thus, they can be effectively used as sealing materials for railway vehicles, sealing materials for servomotors, and the like.

Furthermore, because the fluororubber composition of the present invention comprises wollastonite surface-treated with an amino silane coupling agent or an epoxy silane coupling agent, preferably an amino silane coupling agent, leakage does not occur even in a rotation test for vulcanizates of the fluororubber composition for 1000 hours in a severe environment with poor air permeability. As shown in flon foaming test results in Examples, described later, the vulcanizates exhibit an excellent heat resistance-improving effect and a durability-enhancing effect.

Embodiments for Carrying Out the Invention

The fluororubber includes fluororubber that can be cross-linked with peroxide (peroxide-crosslinkable fluororubber), specifically, a fluorine-containing elastomer having a fluorine content of 63 to 71 wt. % and a Mooney viscosity $ML_{1+10}$ (121° C.) of 20 to 100, and containing iodine and/or bromine as a crosslinking site in the molecule. For example, the following copolymer elastomers can be used:

A copolymer elastomer having a copolymerization composition of about 50 to 80 mol % of vinylidene fluoride, about 15 to 50 mol % of hexafluoropropene, and about 30 to 0 mol % of tetrafluoroethylene, into which an iodine and/or bromine group is introduced.

Practically, Viton GAL200S, GBL200S, GBL600S, GF200S, and GF600S produced by Du Pont, Tecnoflon P457, P757, P459, and P952 produced by Solvay, DAI-EL G952, G901, G902, G912, and G801 produced by Daikin Industries, Ltd., and other commercial products can be used as they are.

A copolymer elastomer having a copolymerization composition of about 50 to 85 mol % of vinylidene fluoride, about 5 to 50 mol % of perfluorovinylether represented by the general formula: $CF_2$=CFORf (Rf: a perfluoroalkyl group having 1 to 10 carbon atoms, preferably a perfluoromethyl group or a perfluorooxyalkyl group having one or more ether bonds in the carbon chain), and about 50 to 0 mol % of tetrafluoroethylene, into which an iodine and/or bromine group is introduced.

Practically, Viton GLT200S, GLT600S, GBLT200S, GBLT600S, GFLT200S, and GFLT600S produced by Du Pont, Tecnoflon PL455, PL855, PL557, PL458, and PL958 produced by Solvay, DAI-EL LT302 and LT301 produced by Daikin Industries, Ltd., and the like can be used as they are.

A copolymer elastomer obtained by introducing an iodine group and/or a bromine group into a vinylidene fluoride [VdF]-hexafluoropropylene [HFP]-tetrafluoroethylene [TFE]-ethylene [E]-perfluoro(methyl vinyl ether) [FMVE] quinary copolymer elastomer.

In practice, Thecnoflon BR9151 and BR9171 (produced by Solvey), etc., are used as they are.

Among these various fluororubbers, the vinylidene fluoride [VdF]-hexafluoropropylene [HFP]-tetrafluoroethylene [TFE]-ethylene [E]-perfluoro(methyl vinyl ether) [FMVE] quinary copolymer is preferably used.

The introduction of an iodine and/or bromine group for enabling peroxide crosslinking of the fluororubber can be carried out by a copolymerization reaction in the presence of an iodine and/or bromine group-containing saturated or unsaturated compound.

When a bromine and/or iodine group is contained as a side chain of a fluorine-containing copolymer, examples of such a copolymer include perfluoro(2-bromoethyl vinyl ether), 3,3,4,4-tetrafluoro-4-bromo-1-butene, 2-bromo-1,1-difluoroethylene, bromotrifluoroethylene, perfluoro(2-iodoethyl vinyl ether), iodotrifluoroethylene, and other crosslinking site-forming monomers.

When an iodine and/or bromine group is contained as the terminal group of a fluorine-containing copolymer, a fluoroalkylene compound halogenated at both ends represented by the general formula: $X_1C_nF_{2n}X_2$F, Br, or I; $X_2$: Br or I; and n: 1 to 12) is used. In terms of the balance of reactivity and handling, copolymers containing an iodine and/or bromine group, derived from 1-bromoperfluoroethane, 1-bromoperfluoropropane, 1-bromoperfluorobutane, 1-bromoperfluoropentane, 1-bromoperfluorohexane, 1-iodoperfluoroethane, 1-iodoperfluoropropane, 1-iodoperfluorobutane, 1-iodoperfluoropentane, and 1-iodoperfluorohexane (n: 1 to 6) are preferably used.

Moreover, when $X_1$ and $X_2$ are I and/or Br, a crosslinking site can be introduced into the terminal position of a fluorine-containing copolymer. Examples of such a compound include 1-bromo-2-iodotetrafluoroethane, 1-bromo-3-iodoperfluoropropane, 1-bromo-4-iodoperfluorobutane, 2-bromo-3-iodoperfluorobutane, monobromomonoiodoperfluoropentane, monobromomonoiodoperfluoro-n-hexane, 1,2-dibromoperfluoroethane, 1,3-dibromoperfluoropropane, 1,4-dibromoperfluorobutane, 1,5-dibromoperfluoropentane, 1,6-dibromoperfluorohexane, 1,2-diiodoperfluoroethane, 1,3-diiodoperfluoropropane, 1,4-diiodoperfluorobutane, 1,5-diiodoperfluoropentane, 1,6-diiodoperfluorohexane, and the like. These compounds can also be used as chain transfer agents.

In the fluororubber, 10 to 50 parts by weight, preferably 25 to 50 parts by weight (30 to 50 parts by weight when an epoxy silane coupling agent is used), of wollastonite is compounded based on 100 parts by weight of the fluororubber. This wollastonite is needle-like or fibrous wollastonite having an average fiber diameter (measured by a laser scattering method) of 5 μm or less, preferably 3 to 5 μm, and an average fiber length (measured by an optical microscope) of 40 to 80 μm, preferably 40 to 60 μm, and is surface-treated with an amino silane coupling agent or an epoxy silane coupling agent. If the amount of wollastonite is less than this range, the sealing properties after abrasion by the use, which is an object of the present invention, cannot be maintained. In contrast, if the amount of wollastonite is greater than this range, the rubber hardness increases, and seal followability is impaired, which is not preferable.

Moreover, if wollastonite that is not surface-treated with an amino silane coupling agent or an epoxy silane coupling agent is used, it is difficult to achieve the desired improvement of heat resistance. If wollastonite having an average fiber diameter greater than the above range is used, gap leakage may occur due to the dropout of the filler from sliding surface. As a result, torque values after abrasion by the use can be maintained, but sealing properties may be reduced. In contrast, if wollastonite having an average fiber length which is outside of the above range is used, torque values after abrasion are deteriorated.

The surface-treatment of wollastonite with an amino silane coupling agent or an epoxy silane coupling agent is performed by a general method, such as a slurry method in which wollastonite is charged in and treated with an alcohol solution of such a silane coupling agent, followed by drying, or a dry method in which such a silane coupling agents is directly sprayed to wollastonite. Commercial products, such as NYGLOS 4W Wollastcoat series and NYAD Wollastcoat series (produced by NYCO Minerals), can be used as they are. Here, examples of amino silane coupling agents include 3-aminopropyltrimethoxysilane, N-(2-aminoethyl)-3- aminopropyltrimethoxysilane, 3-ureidopropyltrimethoxysilane, N-(2-aminoethyl)-3-aminopropylmethyldimethoxysilane, and the like; and examples of epoxy silane coupling agents include 3-glycidoxypropyltrimetoxysilane, 2-(3,4-epoxycyclohexyl)ethyltrimethoxysilane, and the like.

Patent Documents 2 and 3 mentioned above disclose fluororubber compositions comprising wollastonite; however, both compositions are limited to use wollastonite that is not treated with a silane coupling agent. These compositions cannot achieve the desired heat resistance-improving effect.

Examples of the organic peroxide include dicumyl peroxide, cumene hydroperoxide, p-methane hydroperoxide, 2,5-dimethylhexane-2,5-dihydroperoxide, di-tert-butyl peroxide, benzoyl peroxide, m-toluyl peroxide, 2,5-dimethyl-2,5-di(tert-butylperoxy)hexane, 2,5-dimethyl-2,5-di(tert-butylperoxy)hexyne-3, 1,3-di(tert-butylperoxyisopropyl)benzene, 2,5-dimethyl-2,5-dibenzoylperoxyhexane, (1,1,3,3-tetramethylbutylperoxy)2-ethylhexanoate, tert-butyl peroxybenzoate, tert-butyl peroxylaurate, di(tert-butylperoxy)adipate, di(2-ethoxyethylperoxy)dicarbonate, bis-(4-tert-butylcyclohexylperoxy)dicarbonate, and the like. Such an organic peroxide is used at a ratio of 0.5 to 10 parts by weight, preferably 1 to 5 parts by weight, based on 100 parts by weight of fluororubber.

For the peroxide crosslinking with organic peroxide, it is preferable to use a polyfunctional unsaturated compound in combination. Such a polyfunctional unsaturated compound a polyfunctional unsaturated compound that improves mechanical strength, compression set, etc. and includes tri(meth)allyl isocyanurate, tri(meth)allyl cyanurate, triallyl trimellitate, N,N'-m-phenylenebismaleimide, diallyl phthalate, tris(diallylamine)-s-triazine, triallyl phosphite, ethyleneglycol di(meth)acrylate, diethyleneglycol di(meth)acrylate, neopentylglycol di(meth)acrylate, trimethylolpropane tri(meth)acrylate, 1,3-polybutadiene, and the like. Such a polyfunctional unsaturated compound is used at a ratio of about 0.1 to 20 parts by weight, preferably about 0.5 to 10 parts by weight, based on 100 parts by weight of fluororubber. Here, (meth)allyl refers to allyl or methallyl. Similarly, (meth)acrylate refers to acrylate or methacrylate.

The preparation of the composition is carried out in such a manner that components, other than the above components, generally used as rubber compounding agent (e.g., reinforcing agents or fillers, such as carbon black, silica, barium sulfate, talc, and clay; processing aids such as carnauba wax and sodium stearate; an acid acceptor such as an oxide or hydroxide of a divalent metal. and hydrotalcite) are suitably compounded, and the resulting mixture is kneaded using a closed type kneader (e.g., an intermix, kneader, or Banbury mixer) or an open roll to form a sheet-like rubber compound, followed by vulcanization molding using a vulcanizing press into a predetermined shape. Vulcanization is generally carried out by performing heat pressing at about 160 to 200° C. for about 3 to 30 minutes, and optionally oven vulcanization (secondary vulcanization) at about 150 to 250° C. for about 0.5 to 24 hours.

EXAMPLES

The following describes the present invention with reference to Examples.

Example 1

| | |
|---|---|
| Fluororubber (Tecnoflon BR9171, produced by Solvey; a VdF-HFP-TFE-E-FMVE quinary copolymer) | 100 parts by weight |
| MT carbon black (THERMAX N-990LSR, produced by Cancarb Limited) | 2 parts by weight |
| Wollastonite surface-treated with amino silane coupling agent (NYGLOS 4W Wollastcoat 10012, produced by NYCO Minerals; average fiber diameter: 4.5 μm, average fiber length: 50 μm, aspect ratio: 11) | 25 parts by weight |
| Hydrotalcite (DHT-4A, produced by Kyowa Chemical Industry Co., Ltd.) | 6 parts by weight |
| Carnauba wax (VPA No. 2, produced by DuPont Dow Elastomers) | 2 parts by weight |
| Organic peroxide (Perhexa 25B-40, produced by NOF Corporation) | 2 parts by weight |
| Triallyl isocyanurate (TAIC WH-60, produced by Nippon Kasei Co., Ltd.) | 2 parts by weight |

The above components were kneaded by a kneader and an open roll, and primary vulcanization at 180° C. for 4 minutes and secondary vulcanization at 200° C. for 15 hours were performed. Thus, a rubber sheet (test piece) having a thickness of 2 mm and an oil seal having an inner diameter of 80 mm, an outer diameter of 105 mm, and a width of 11.5 mm were vulcanization-molded.

Example 2

In Example 1, the amount of wollastonite was changed to 35 parts by weight.

Example 3

In Example 1, the amount of wollastonite was changed to 50 parts by weight.

Comparative Example 1

In Example 1, the amount of wollastonite was changed to 60 parts by weight.

Example 4

In Example 1, the amount of wollastonite was changed to 15 parts by weight.

Example 5

In Example 1, the amount of wollastonite was changed to 10 parts by weight.

Comparative Example 2

In Example 1, the amount of wollastonite was changed to 5 parts by weight.

Comparative Example 3

In Example 1, the same amount of a NYGLOS 4W produced by NYCO Minerals that is not surface-treated with a silane coupling agent (average fiber diameter: 4.5 μm, average fiber length: 50 μm, aspect ratio: 11) was used as the wollastonite.

Comparative Example 4

In Example 1, 35 parts by weight of a NYGLOS 4W produced by NYCO Minerals that is not surface-treated with a silane coupling agent (average fiber diameter: 4.5 μm, average fiber length: 50 μm, aspect ratio: 11) was used as the wollastonite.

Example 6

In Example 1, the same amount of a NYGLOS 4W Wollastcoat 10222 produced by NYCO Minerals that is surface-treated with an epoxy silane coupling agent (average fiber diameter: 4.5 μm, average fiber length: 50 μm, aspect ratio: 11) was used as the wollastonite.

Comparative Example 5

In Example 1, the same amount of a NYGLOS 4W Wollastcoat 10412 produced by NYCO Minerals that is surface-treated with a vinyl silane coupling agent (average fiber diameter: 4.5 μm, average fiber length: 50 μm, aspect ratio: 11) was used as the wollastonite.

Comparative Example 6

In Example 1, the same amount of a NYAD 400 produced by NYCO Minerals that is not surface-treated with a silane coupling agent (average fiber diameter: 7 μm, average fiber length: 35 μm, aspect ratio: 5) was used as the wollastonite.

Comparative Example 7

In Example 1, the same amount of a NYAD 400 Wollastcoat 10012 produced by NYCO Minerals that is surface-treated with a amino silane coupling agent (average fiber diameter: 7 μm, average fiber length: 35 μm, aspect ratio: 5) was used as the wollastonite.

Comparative Example 8

In Example 1, the same amount of a NYAD 400 Wollastcoat 10222 produced by NYCO Minerals that is surface-treated with an epoxy silane coupling agent (average fiber diameter: 7 μm, average fiber length: 35 μm, aspect ratio: 5) was used as the wollastonite.

Example 7

In Example 1, the same amount of a Tecnoflon P757 produced by Solvey (a VdF-HFP-TFE tenary copolymer) was used as the fluororubber.

Using the rubber sheets and oil seals obtained in the above Examples and Comparative Examples, the normal state physical properties and durability were measured. Further, rotation tests of oil seal products were also performed for Examples 1, 4, and 5.

Normal state physical properties (hardness): According to JIS K6253 (1997) corresponding to ISO 7619-1, hardness was measured using a type A durometer Normal state physical properties (tensile strength, elongation): According to JIS K6251 (2010) corresponding to ISO 37

Moldability: The presence of fracture during molding was visually confirmed

Durability: An oil seal was set in a rotation tester, gear oil (EP3080 alternative oil) was sealed in a state centering on the rotating shaft, and the oil temperature was naturally raised from room temperature. A cycle of normal rotation for 5 hours, pause for 2 minutes, reverse rotation for 5 hours, and pause for 2 minutes was performed for 1000 hours in total at a rotational frequency of 6500 rpm (peripheral speed: 27.2 m/sec). The presence of leakage was confirmed.

Flon foaming test: A test piece having a width of 20 mm and a length of 25 mm was dipped in a refrigerant R134a at room temperature for 24 hours, and then heated at 50° C. or 60° C. for 1 hour. The presence of foaming after completion of heating was visually confirmed.

The test results are shown in the following Tables 1 to 2.

TABLE 1

| Measurement item | Ex. 1 | Ex. 2 | Ex. 3 | Comp. Ex. 1 | Ex. 4 | Ex. 5 | Comp. Ex. 2 |
|---|---|---|---|---|---|---|---|
| [Normal-state physical properties] | | | | | | | |
| Hardness (durometer A) | 75 | 79 | 83 | 86 | 72 | 68 | 65 |
| Tensile strength (MPa) | 13.9 | 16.0 | 16.6 | 18.6 | 16.4 | 12.7 | 13.2 |
| Elongation at break (%) | 380 | 310 | 270 | 190 | 450 | 440 | 480 |
| [Moldability] | | | | | | | |
| Fracture | none | none | none | yes | none | none | none |
| [Durability] | | | | | | | |
| Leakage after a rotation test | none | — | — | — | none | none | — |
| [Flon foaming test] | | | | | | | |
| 50° C. | none | none | none | none | none | none | yes |
| 60° C. | none | none | none | non | yes | yes | yes |

TABLE 2

| Measurement item | Ex. 6 | Comp. Ex. 3 | Comp. Ex. 4 | Comp. Ex. 5 | Comp. Ex. 6 | Comp. Ex. 7 | Comp. Ex. 8 | Ex. 7 |
|---|---|---|---|---|---|---|---|---|
| [Normal-state physical properties] | | | | | | | | |
| Hardness (durometer A) | 76 | 76 | 79 | 76 | 70 | 71 | 72 | 74 |
| Tensile strength (MPa) | 12.0 | 20.1 | 15.5 | 11.8 | 14.5 | 11.9 | 12.4 | 14.3 |
| Elongation at break (%) | 440 | 520 | 470 | 460 | 540 | 480 | 500 | 400 |
| [Moldability] | | | | | | | | |
| Fracture | none | none | none | none | none | none | none | none |
| [Flon foaming test] | | | | | | | | |
| 50° C. | none | yes | yes | yes | yes | yes | yes | none |
| 60° C. | yes | yes | yes | yes | yes | yes | yes | none |

The above results demonstrate the following:

(1) In Examples 1 to 3, in which 25 to 50 parts by weight of wollastonite surface-treated with an amino silane coupling agent was used, foaming was not confirmed in the flon foaming test at a temperature of either 50° C. or 60° C.

(2) In Examples 4 and 5, in which 10 to 15 parts by weight of wollastonite surface-treated with an amino silane coupling agent was used, and in Example 6, in which 25 parts by weight of wollastonite surface-treated with an epoxy silane coupling agent was used, foaming was not confirmed in the flon foaming test at a temperature of 50° C.

Foaming was confirmed at 60° C.; thus, when 10 to 15 parts by weight of wollastonite surface-treated with an amino silane coupling agent, or 25 parts by weight of wollastonite surface-treated with an epoxy silane coupling agent was used, a heat resistance-improving effect was recognized, compared with when wollastonite not surface-treated with a silane coupling agent was used. The effect, however, was smaller than that obtained when wollastonite surface-treated with 25 to 50 parts by weight of amino silane coupling agent was used.

This indicates that the heat resistance-improving effect is low, when the compounding ratio of wollastonite surface-treated with an amino silane coupling agent is low (10 to 15 parts by weight), and when wollastonite surface-treated with an epoxy silane coupling agent is used, even though the wollastonite compounding ratio is 25 parts by weight.

(3) In Comparative Example 1, in which 60 parts by weight (equal to or more than the predetermined amount) of wollastonite surface-treated with an amino silane coupling agent was used, foaming was not confirmed in the flon foaming test at a temperature of either 50° C. or 60° C.; however, the occurrence of fracture during molding was confirmed.

(4) In Comparative Example 2, in which 5 parts by weight (equal to or less than the predetermined amount) of wollastonite surface-treated with an amino silane coupling agent was used, foaming was confirmed in the flon foaming test at both temperatures of 50° C. and 60° C. Even in the case where wollastonite surface-treated with an amino silane coupling agent, which has a high foaming-preventing effect, is used, the desired heat resistance-improving effect cannot be obtained when wollastonite is used in an amount equal to or less than the predetermined amount, and the polymer ratio is higher.

(5) In Comparative Examples 3 and 4, in which wollastonite not surface-treated with a silane coupling agent was used, foaming was confirmed in the flon foaming test at both temperatures of 50° C. and 60° C.

(6) In Comparative Example 5, in which wollastonite surface-treated with a vinyl silane coupling agent was used, foaming was confirmed in the flon foaming test at both temperatures of 50° C. and 60° C. Even in the case where wollastonite surface-treated with a silane coupling agent is used, it is difficult to obtain an effect of improving heat resistance when surface treatment is not preformed using an amino silane coupling agent or an epoxy silane coupling agent.

(7) Even when wollastonite surface-treated with an amino silane coupling agent or an epoxy silane coupling agent was used, in Comparative Examples 7 and 8, in which wollastonite whose average fiber diameter and average fiber length were outside of the predetermined ranges was used, foaming was confirmed in the flon foaming test at both temperatures of 50° C. and 60° C. Thus, even in the case where wollastonite surface-treated with a specific silane coupling agent is used, the desired heat resistance-improving effect cannot be obtained when the wollastonite has a small aspect ratio.

INDUSTRIAL APPLICABILITY

Crosslinked products (e.g., sealing materials) of the fluororubber compositions according to the present invention can be effectively used as sliding seals, such as oil seals for railways, automobiles, aircraft, or industrial machines, all of which require normal and reverse rotation.

The invention claimed is:

1. A fluororubber composition comprising 10 to 50 parts by weight of wollastonite and 0.5 to 10 parts by weight of organic peroxide based on 100 parts by weight of peroxide-crosslinkable fluororubber,
   the wollastonite being needle-like or fibrous wollastonite having an average fiber diameter of 5 μm or less and an average fiber length of 40 to 80 μm, and
   the wollastonite being surface-treated with an amino silane coupling agent.

2. The fluororubber composition according to claim 1, wherein the wollastonite is used in an amount of 25 to 50 parts by weight based on 100 parts by weight of fluororubber.

3. A sealing material molded by vulcanizing of the fluororubber composition according to claim 2.

4. The sealing material according to claim 3, which is used as oil seal.

5. The sealing material according to claim 4, which is used as a normal/reverse rotation oil seal.

6. The sealing material according to claim 5, which is used as a normal/reverse rotation oil seal for railway vehicles.

7. A sealing material molded by vulcanizing of the fluororubber composition according to claim 1.

8. The sealing material according to claim 7, which is used as oil seal.

9. The sealing material according to claim 8, which is used as a normal/reverse rotation oil seal.

10. The sealing material according to claim 9, which is used as a normal/reverse rotation oil seal for railway vehicles.

* * * * *